United States Patent [19]
Gibbons

[11] Patent Number: 5,975,216
[45] Date of Patent: Nov. 2, 1999

[54] LOW PROFILE TRANSFERRABLE HYDRAULIC THREE POINT HITCH

[75] Inventor: Robert A. Gibbons, Marion, Mass.

[73] Assignee: Tructor, Inc., Marion, Mass.

[21] Appl. No.: 08/948,864

[22] Filed: Oct. 10, 1997

[51] Int. Cl.[6] .................................................. A01B 59/043
[52] U.S. Cl. .......................................... 172/439; 172/677
[58] Field of Search .................................... 172/439, 443, 172/448, 677, 680

[56] References Cited

U.S. PATENT DOCUMENTS

| | | | |
|---|---|---|---|
| D. 386,769 | 11/1997 | Gibbons | D15/23 |
| 3,749,421 | 7/1973 | Rudd | 172/439 |
| 5,029,650 | 7/1991 | Smit | 172/439 X |
| 5,169,279 | 12/1992 | Zimmerman | 172/439 X |
| 5,201,539 | 4/1993 | Mayfield | 172/439 X |
| 5,346,018 | 9/1994 | Koster | 172/439 X |
| 5,423,394 | 6/1995 | Kendle | 172/439 X |
| 5,538,264 | 7/1996 | Brown et al. | 172/439 X |
| 5,542,477 | 8/1996 | De Francq | 172/439 |
| 5,647,441 | 7/1997 | Gibbons | 172/439 |
| 5,657,825 | 8/1997 | Englund | 172/439 |
| 5,692,573 | 12/1997 | Zahn et al. | 172/439 |
| 5,706,901 | 1/1998 | Walters et al. | 172/439 |
| 5,722,493 | 3/1998 | Dixon | 172/439 X |
| 5,730,227 | 3/1998 | Hund | 172/439 |
| 5,743,339 | 4/1998 | Alexander, III | 172/439 X |

*Primary Examiner*—Christopher J. Novosad
*Attorney, Agent, or Firm*—Iandiorio & Teska; Brain J. Colandreo

[57] ABSTRACT

A self-contained hydraulic three point hitch assembly including a plate; a pair of frame rail mounts, a pair of strut mounts, a pair of hydraulic actuator mounts, and a pair of lifting arm mounts on the plate; a pair of lifting arms, each pivotally attached to a lifting arm mount; a pair of hydraulic actuators each interconnected between a hydraulic actuator mount and a lifting arm; and a pair of struts, each attached on one end to a strut mount.

19 Claims, 6 Drawing Sheets

LOW PROFILE TRANSFERRABLE HYDRAULIC THREE POINT HITCH

FIELD OF INVENTION

This invention relates to a self-contained hydraulic hitch assembly which can be easily and quickly mounted on or dismounted from either the front or the back of a vehicle.

BACKGROUND OF INVENTION

While agriculture and farming was at one time a very traditional way of life for many people around the world, the desire for higher output and efficiency has forced the industry to become highly mechanized. Todays farmers use a complex array of implements and machinery to maintain their farms and process their crops. As the complexity and specialty of this farming machinery increased, so has the cost of such machinery.

This increased cost has resulted in problems for many smaller U.S. farmers and farmers in developing countries. Quite often, today's farm equipment is so specialized that it can perform only one or possibly two functions. This situation mandates that farmers, in order to maintain competitiveness, buy multiple pieces of equipment to accomplish all the tasks associated with running a farm. As would be expected, this requires the farmer to go deeply in debt, which often results in farmers overextending themselves and going bankrupt. In response to the need by smaller farmers for a multi-purpose agricultural vehicle, several companies have started to manufacture multi-purpose vehicles which combine the features of a dump truck and a tractor. One such vehicle is disclosed in U.S. Design patent application 29/050,237 now U.S. Pat. No. D386,769. These vehicles usually incorporate a tilting dump body, but generally do not have a three point hitch assembly which can be attached to standard plowing, seeding, and other implements. On the other hand, the three point hitch assemblies traditionally incorporated into standard farm tractors are large, complex, specially-manufactured devices which include numerous hydraulic lines, control valves and mechanical linkages. Such three point hitch assemblies are generally not removable from the vehicles upon which they are mounted. In addition, if a three point hitch assembly is needed on the front as well as on the rear of the vehicle, a second hitch assembly would have to be purchased and permanently attached to the other end of the vehicle.

U.S. Pat. No. 5,647,441 discloses a self-contained three point hitch adapted to be attached to the rear of a vehicle and which could be attached to the front of the vehicle with some modification to the hitch and the vehicle. Still, no art that we know of specifically discloses a self contained three point hitch easily mounted on either the front or the rear of a vehicle.

SUMMARY OF INVENTION

It is therefore an object of this invention to provide a self-contained hydraulic three point hitch assembly including all the necessary hydraulic and mechanical components.

It is a further object of this invention to provide such a hitch assembly in which a plate, which houses all necessary hitch components, is easily attachable to and detachable from the vehicle upon which it is mounted.

It is a further object of this invention to provide such a hitch assembly which can easily be mounted on either the front or the back of a vehicle.

It is a further object of this invention to provide such a hitch assembly which is simple in design, fairly lightweight, and which can easily be maintained and serviced.

This invention results from the realization that a self-contained hydraulic three point hitch assembly can be made easily removable and mountable on either the front or the back of a vehicle by utilizing a single plate to which all necessary components are attached (a pair of lifting arms, a top link, and a pair of hydraulic actuators) and by utilizing a pair of struts and a pair of frame rail mounts which allow the plate to be easily attached to and removed from either end of the chassis of a vehicle.

This invention features a self-contained three point hitch assembly including a three point hitch and a pair of struts. The three point hitch includes a plate, means for attaching the top of the plate to a vehicle chassis such as a pair of frame rail mounts, and means for attaching the bottom of the plate to a vehicle chassis such as a pair of strut mounts. A pair of hydraulic actuator mounts and a pair of lifting arm mounts are attached to the plate. A pair of lifting arms are each pivotally attached to one lifting arm mount and a pair of hydraulic actuators are each interconnected between one hydraulic actuator mount and one lifting arm. The struts are each attached on one end to a strut mount on the plate. Various types of fasteners are used to removably secure the other end of each strut and the frame rail mounts to the chassis of a vehicle. One type of fastener is a quick disconnect pin.

Since this hitch assembly is designed to be used on either end of a vehicle chassis and the frame rail spacing between the front and the back of a vehicle may be different, spacer means are typically employed to equalize the spacing of the frame rails between the front and the rear of the vehicle chassis. A forward strut mount member of the spacer means provides an attachment point for releasably attaching the second end of each strut to the spacer means.

The plate typically includes a housing for a power take-off motor. An electrically powered or hydraulically actuated power take-off motor is mounted in this housing. A standard trailer hitch receiver may also be formed as part of the plate. To provide clearance for the center section of the vehicle's differential assembly, a differential relief opening is incorporated into the plate. Regulating means, connected to the hydraulic actuators, adjust the height of the lifting arms and quick disconnect fittings on all the hydraulic lines allow for easy installation and removal of the three point hitch assembly from the vehicle.

DISCLOSURE OF PREFERRED EMBODIMENT

Other objects, features and advantages will occur to those skilled in the art from the following description of a preferred embodiment and the accompanying drawings, in which.

Figure 1:
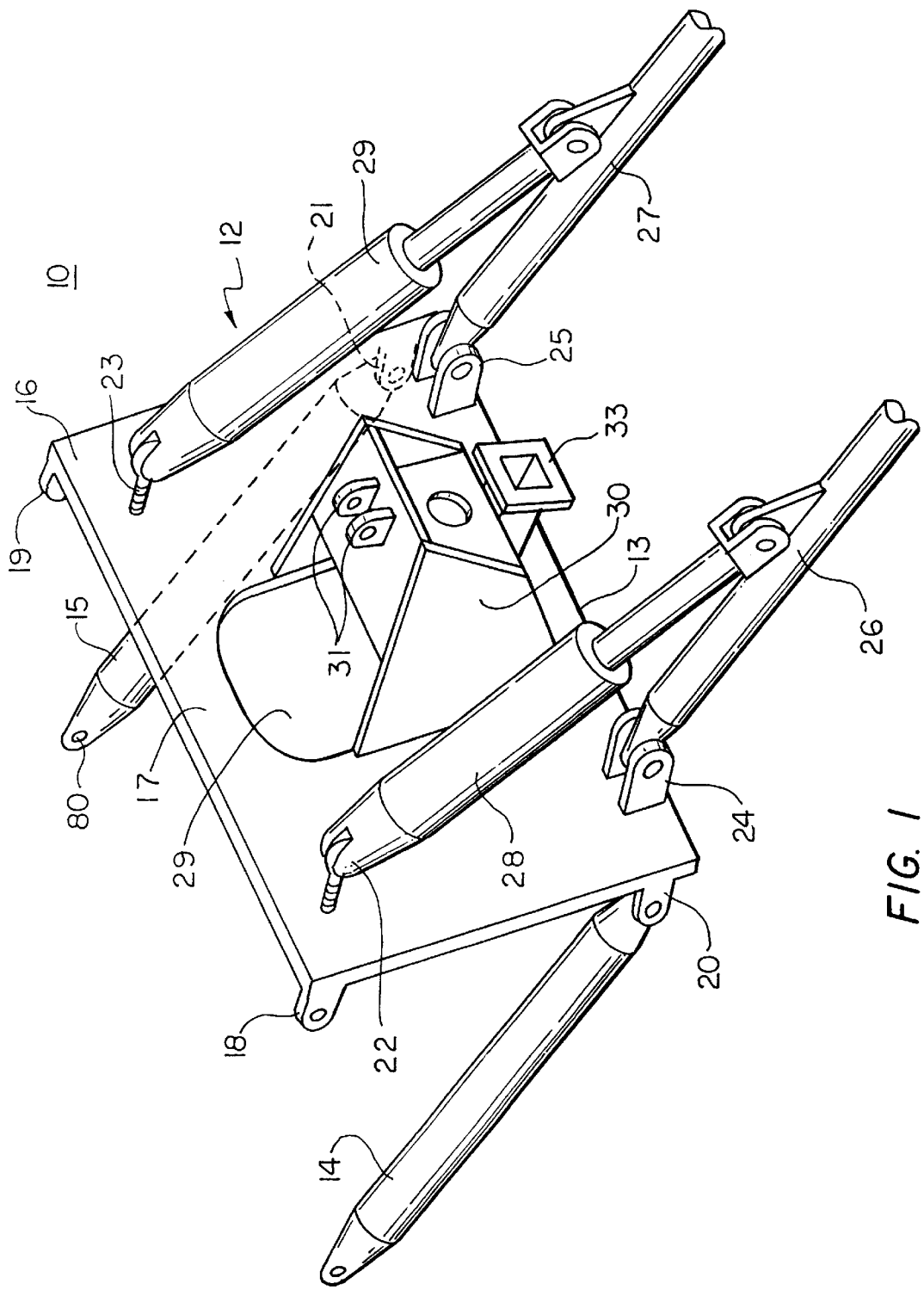
FIG. 1 is a schematic view of the three point hitch assembly of this invention.
Figure 5:
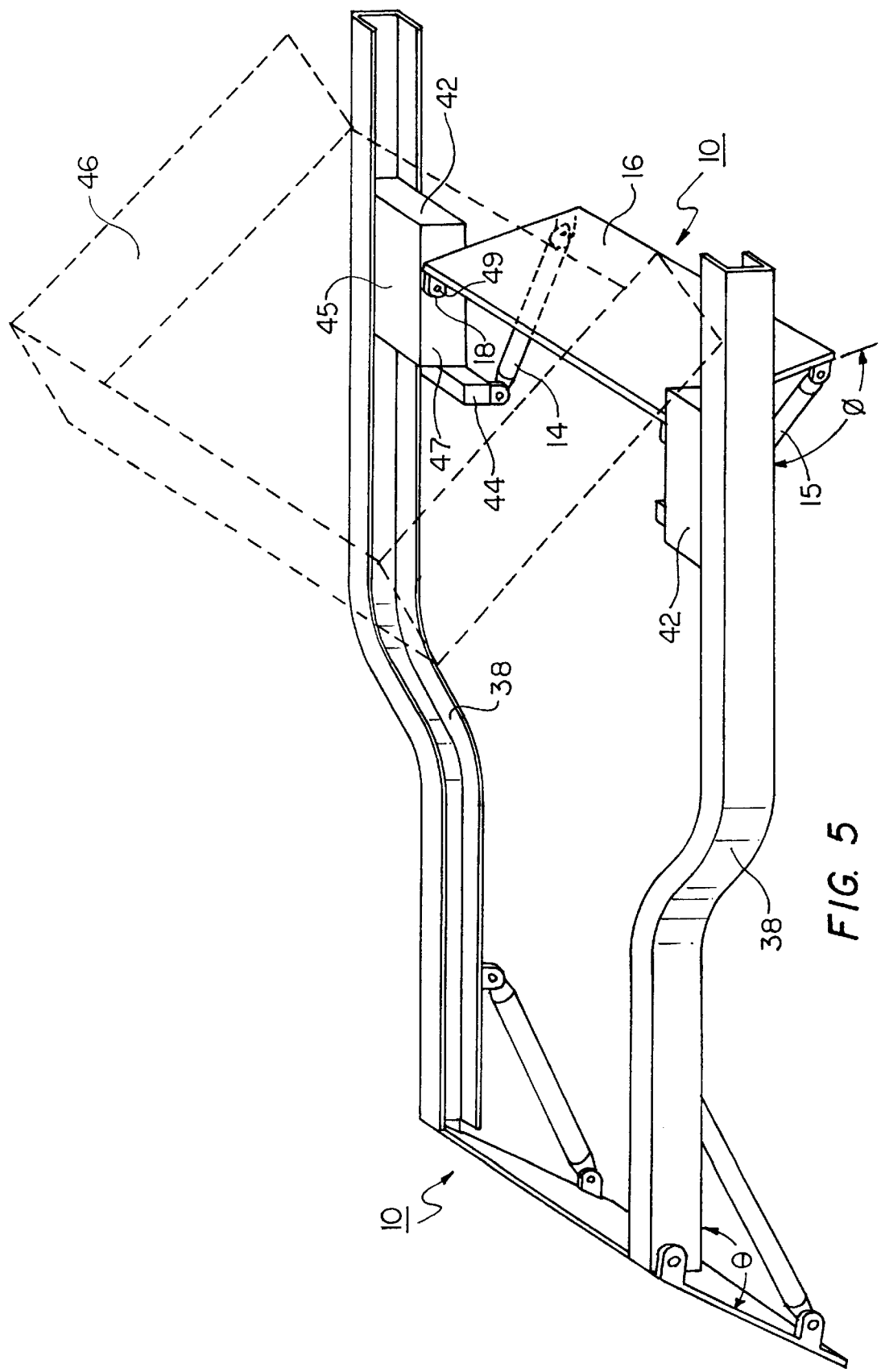
Figure 6:
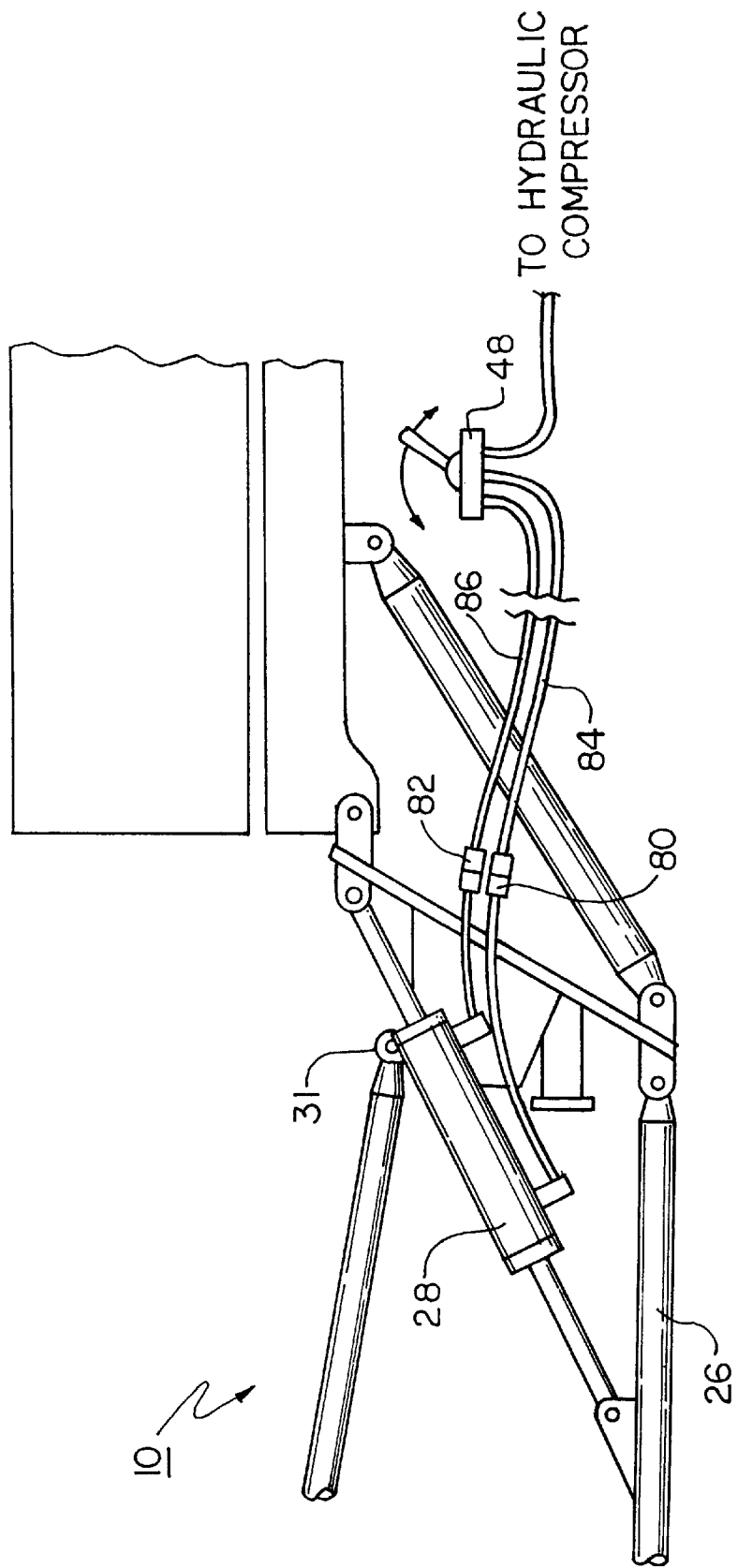

FIG. 5 is a more detailed schematic view of the self-contained hydraulic three point hitch assembly of FIG. 1 mounted on both the front and rear of a vehicle chassis and also showing the spacer assembly, in accordance with this invention, for mounting the three point hitch assembly on the rear of a vehicle with wider rear frame rails; and FIG. 6 is a perspective view of the self-contained hydraulic three point hitch assembly of this invention showing the hydraulic lines and the controller which adjusts the hydraulic actuators in accordance with this invention.

Self-contained hydraulic three point hitch assembly 10, FIG. 1 according to this invention includes three point hitch 12 and a pair of struts 14 and 15. Three point hitch 12 has plate 16 to which all necessary components of three point hitch 12 are attached. Plate 16 may be constructed of ¾" plate steel. On plate 16 is top link mount 31, means for attaching the top 17 of plate 16 to a vehicle chassis, such as frame rail mounts 18 and 19, and means for attaching the bottom 13 of plate 16 to a vehicle chassis, such as strut mounts 20 and 21. Plate 16 also includes hydraulic actuator mounts 22 and 23 and lifting arm mounts 24 and 25. Three point hitch 12 includes lifting arms 26 and 27, pivotally attached to lifting arm mounts 24 and 25, respectively, and hydraulic actuators 28 and 29, each attached on one end to hydraulic actuator mounts 22 and 23, respectively, and on the other end to lifting arms 26 and 27, respectively. Hydraulic actuators 28 and 29 may be standard 3¼" and 3½"'"Cross" brand actuators connected in series to achieve uniform actuation, and lifting arms 26 and 27 may be any standard, three point category I or II lower link.

Figure 2:
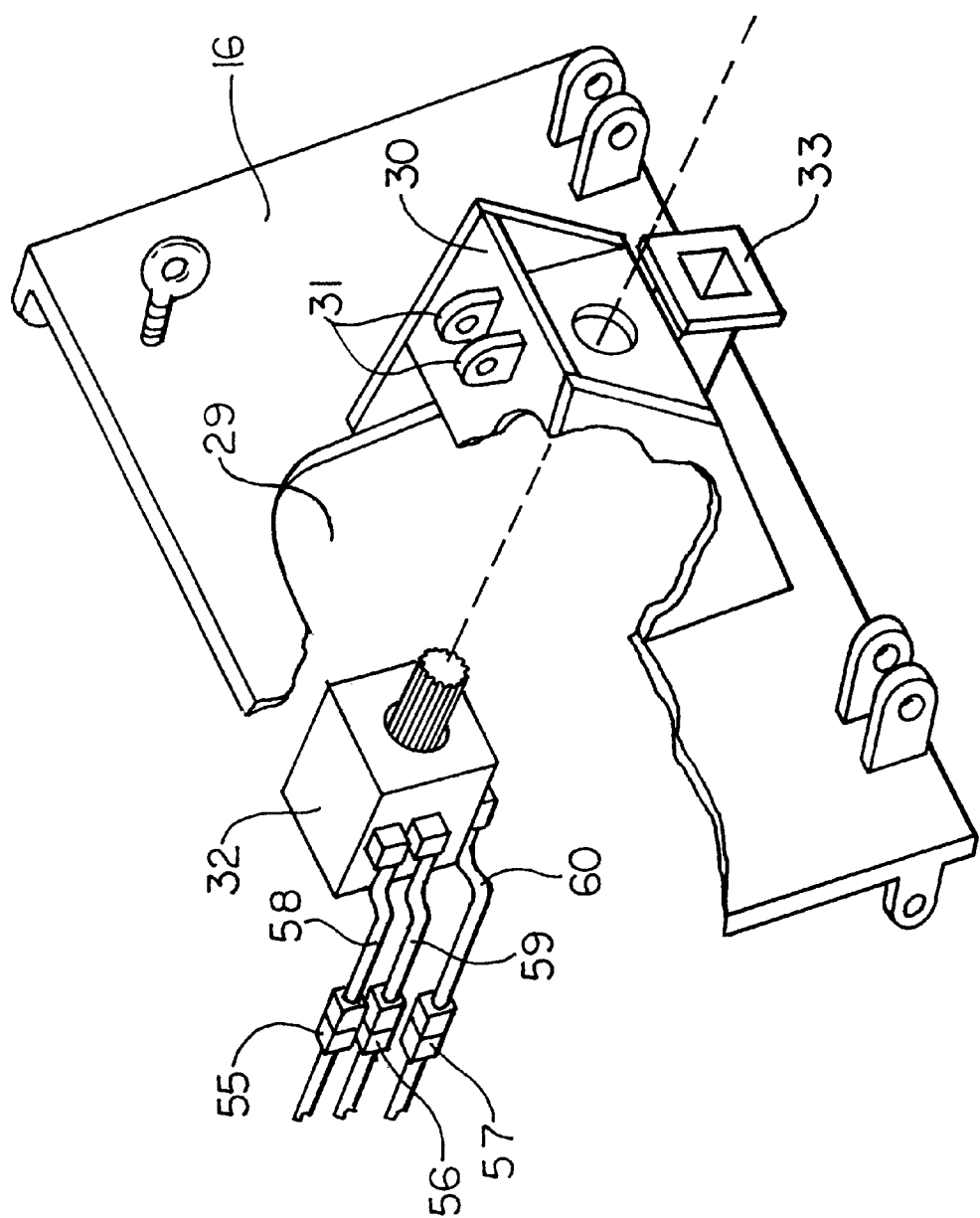
FIG. 2 is a cut-away schematic view of the assembly shown in FIG. 1 showing the hydraulic power take-off motor in accordance with this invention.

Since tractors are often required to provide power to the implements which are hitched to them, plate 16 includes housing 30 in which power take-off motor 32, FIG. 2 is mounted. Housing 30 preferably includes top link mount 31. Power take-off motor 32 is either electrically or mechanically actuated. If hydraulically actuated, power take off motor 32 includes quick disconnect fittings 55, 56, and 57 on hydraulic lines 58, 59, and 60 for facilitating the easy removal of plate 16 from either the front or rear of the vehicle. Power take-off motor 32 may be a HB 105, White Hydraulics Co. Motor. Plate 16, FIG. 1 also includes a trailer hitch receiver 33 and differential relief opening 29 which provides clearance for the center section of a differential, especially when plate 16 is mounted on the rear of the vehicle (see FIG. 4).

Since plate 16 of self-contained hydraulic three point hitch assembly 10 incorporates all the necessary mechanical and hydraulic components of a three point hitch, self-contained hydraulic three point hitch assembly 10 is easily attached to and detached from either end of the chassis of a vehicle.

Figure 3:
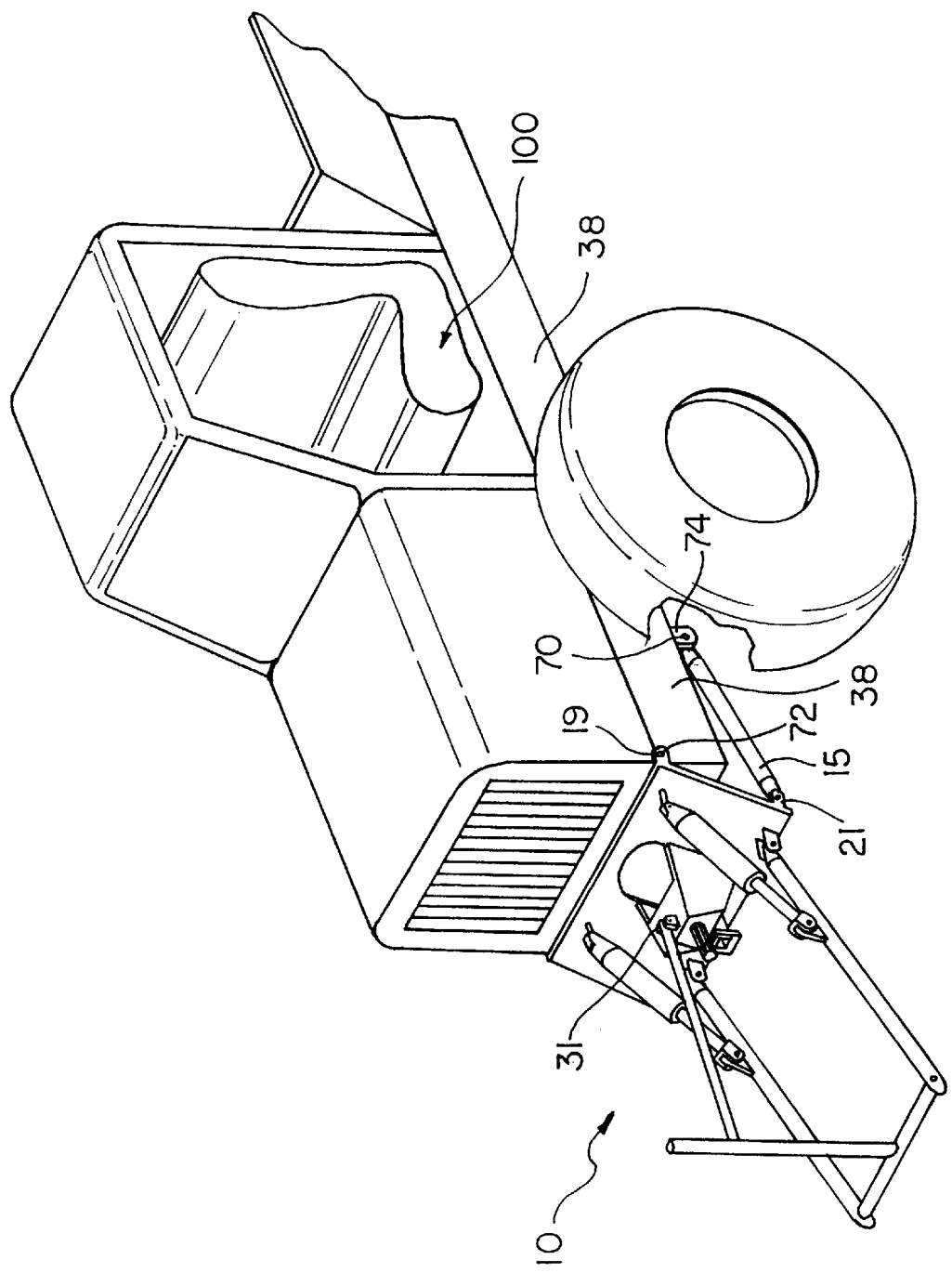
FIG. 3 is a schematic view of the self-contained hydraulic three point hitch assembly of FIG. 1 mounted on the front of a vehicle.

FIG. 3 shows three point hitch assembly 10 mounted to the front frame rails 38 of a multi-purpose agricultural vehicle 100. Fastener means 72, such as a bolt or a pin, secures frame rail mount 19 to frame rail 38 through which a hole is drilled to receive fastener 72. Mount 74 is welded to frame rail 38 and includes an orifice through which a similar fastener 70 is received after passing through hole 80, FIG. 1, in strut 15. Frame rail mount 18 and strut 14 are mounted to the vehicle chassis in a similar fashion. Struts 14 and 15 are pivotably attached to strut mounts 20 and 21 using similar fasteners.

Figure 4:
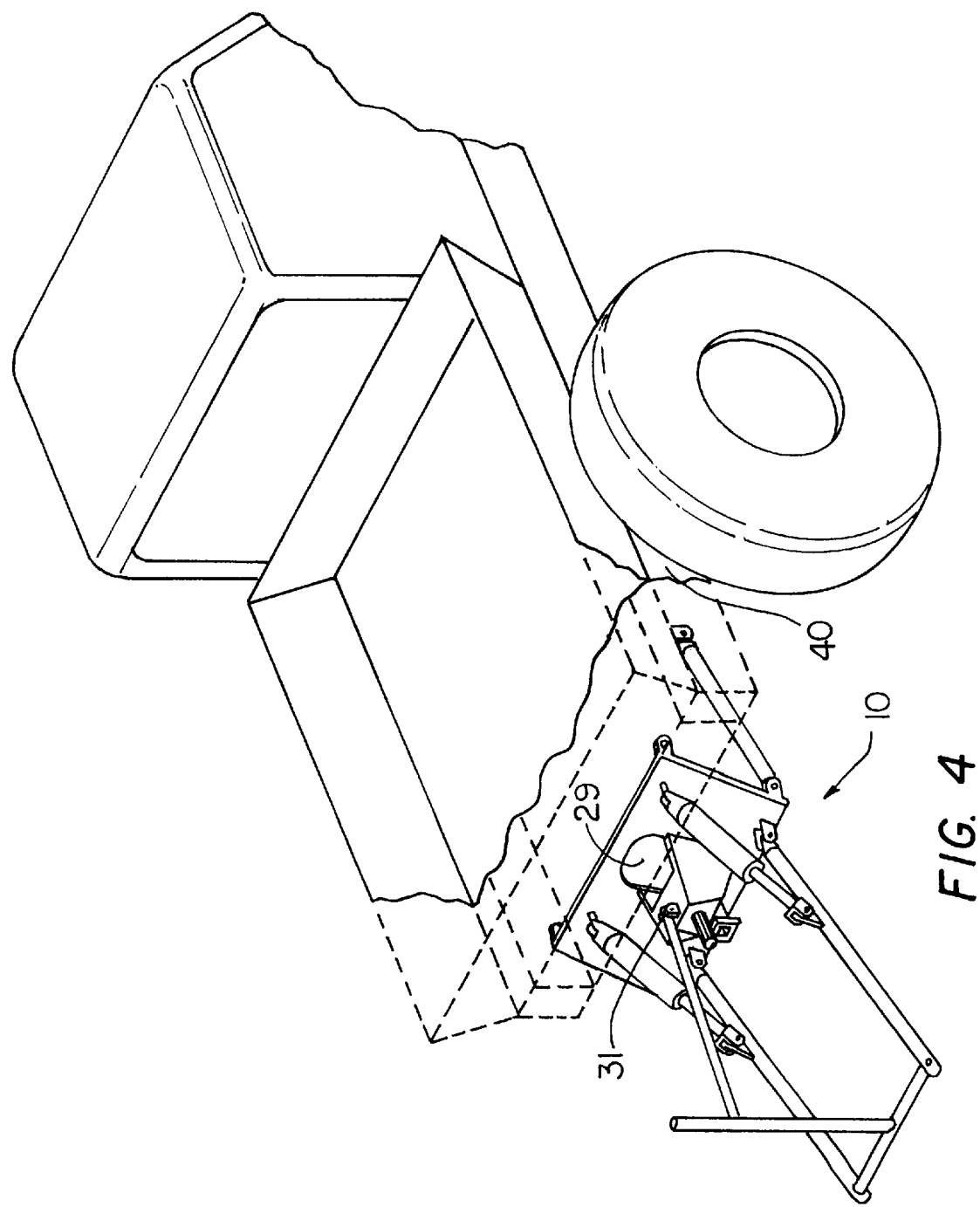
FIG. 4 is a schematic view of the self-contained hydraulic three point hitch assembly of FIG. 1 mounted on the rear of a vehicle.

FIG. 4 shows the three point hitch assembly 10 attached to the rear frame rails 40 of a vehicle with constant width frame rails. Since the frame rails at the rear of the vehicle are often spaced wider than the frame rails at the front of the vehicle as shown in FIG. 5, spacer means 42 are used to equalize the spacing between the front and rear frame rails of a vehicle chassis. Spacer means 42 includes a forward strut mount member 44 attached to box 45, to which struts 14 and 15 are attached. An orifice (not shown) in side wall 47 of box 45 receives fastener 49 which passes through frame rail mount 18. Box 45 is preferably positioned forward of the distal end of the rear frame rails of the vehicle so that dump body 46 (shown in phantom) attached to the vehicle chassis can dump its load without hitting three point hitch assembly 10.

During operation, the height of the lifting arms 26 and 27 and therefore the height of the implement attached thereto, is controlled by regulating means 48, FIG. 6, which adjusts the height of the lifting arms 26 and 27 by adjusting the flow and pressure of hydraulic fluid delivered to hydraulic actuators 28 nd 29. Regulating means 48 is typically a standard double acting hydraulic control valve such as Cross, Model SA-22. In addition, quick disconnect fittings 81 and 82 are incorporated into the hydraulic lines 84 and 86 between hydraulic actuators 28 and 29 and control valve 48 so that the lines are easily disconnected when three point hitch assembly 10 is removed from the vehicle and/or attached at the other end of the vehicle.

In this way, a self-contained hydraulic three point hitch assembly 10, FIG. 1 is easily removable and mountable on either the front (see FIG. 3) or the back (see FIGS. 4 and 5) of vehicle 100 by utilizing single plate 16 to which all necessary components are attached: lifting arms 26 and 27, top link mount 31, and hydraulic actuators 28 and 29. Struts 14 and 15 and frame rail mounts 18 and 119 allow plate 16 to be easily installed and removed from either end of vehicle 100 thus facilitating the use of implements normally used on the front or rear of a vehicle. Spacer means 42 welded to the rear of frame rails 38, FIG. 5 facilitates the mounting of assembly 10 on the rear of the vehicle without modification to assembly 10 when the spacing of the frame rails at the front and rear of the vehicle's chassis differs as is the case in standard commercial light or heavy duty trucks. In other vehicles, spacer means 42 is not required (see FIG. 4). Plate 16, FIG. 1 is typically 18 inches tall and 30 inches wide. Struts 14 and 15 are about 15 inches long. Angle θ, FIG. 5, is usually about 112½ degrees. Angle Φ is about 112½ degrees. Box 45 is typically 10 inches long, 5.5 inches wide, and 6 inches deep. Member 44 is typically about 10 inches long. Box 45 is typically mounted between about 1 and 3 feet from the distal ends of rails 38.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A self-contained hydraulic three point hitch assembly comprising:

a three point hitch including:
      a plate,
      a pair of frame rail mounts on said plate,
      a pair of strut mounts on said plate,
      a pair of hydraulic actuator mounts on said plate,
      a pair of lifting arm mounts on said plate,
      a pair of lifting arms, each pivotally attached to a said lifting arm mounts, and
      a pair of hydraulic actuators, each interconnected between a said hydraulic actuator mount and a said lifting arm;
   a pair of struts, each attached on a first end to a said strut mount; and
   fastener means for removably securing said frame rail mounts and a second end of said struts to a vehicle chassis for positioning said plate so that the surface of said plate is not perpendicular to the vehicle chassis.

2. The three point hitch assembly of claim 1 wherein said vehicle chassis comprises front and rear frame rails, and further including spacer means adopted to be positioned between the frame rail mounts and the vehicle chassis for equalizing the spacing between the front and the rear frame rails of said vehicle chassis.

3. The three point hitch assembly of claim 2 in which said spacer means includes a strut mount member for releasably attaching said second end of each strut to the spacer means.

4. The three point hitch assembly of claim 1 in which said plate further includes a housing for a power takeoff motor.

5. The three point hitch assembly of claim 4 further comprising a power takeoff motor mounted within said housing.

6. The three point hitch assembly of claim 5 in which said power takeoff motor is hydraulically actuated.

7. The three point hitch assembly of claim 1 in which said plate further includes a trailer hitch receiver.

8. The three point hitch assembly of claim 1 in which said plate further includes a differential relief opening.

9. The three point hitch assembly of claim 1 further comprising regulating means connected to the hydraulic actuators for adjusting the height of the lifting arms.

10. The three point hitch assembly claim 1 in which said fastener means includes a plurality of quick disconnect pins.

11. A self-contained hydraulic three point hitch assembly comprising:

a three point hitch including:
  a plate,
  a pair of frame rail mounts on said plate, and
  a pair of strut mounts on said plate; and
a pair of struts, each attached on a first end to a said strut mount; and
means for removably securing said frame rail mounts and a second end of said struts to a vehicle chassis for positioning said plate so that the surface of said plate is not perpendicular to the vehicle chassis.

12. The three point hitch assembly of claim 11 in which said three point hitch further includes:

a pair of hydraulic actuator mounts on said plate;
a pair of lifting arm mounts on said plate;
a pair of lifting arms, each pivotally attached to a said lifting arm mount; and
a pair of hydraulic actuators, each interconnected between a said hydraulic actuator mount and a said lifting arm.

13. The three point hitch assembly of claim 12 wherein said vehicle chassis comprises front and rear frame rails, and further comprising spacer means for equalizing the spacing between the front and rear frame rails of said vehicle chassis.

14. The three point hitch assembly claim 13 in which said spacer means includes a strut mount member for releasably attaching said second end of said struts to said spacer means.

15. The three point hitch assembly of claim 11 in which said plate further includes a differential relief opening.

16. A removable three point hitch comprising:

a plate having a top portion and a bottom portion;
means for attaching the top portion of said plate to a vehicle chassis;
means for attaching the bottom portion of said plate to a vehicle chassis for positioning said plate so that the surface of said plate is not perpendicular to the vehicle chassis;
a pair of lifting arms pivotally connected to said plate; and
means for raising and lowering said lifting arms.

17. The three point hitch of claim 16, in which said means for attaching the top of said plate to a vehicle chassis includes a pair of spaced frame rail mounts on the top of said plate.

18. The three point hitch of claim 16 in which said means for attaching the bottom of said plate to a vehicle chassis includes a pair of struts, each attached on one end to the bottom of said plate and each attachable on the other end to a vehicle chassis.

19. The three point hitch of claim 16 in which said means for raising and lowering said lifting arms includes a pair of hydraulic actuators, each connected on one end to said plate and each connected on the other end to one said lifting arm.

* * * * *